(12) United States Patent
Strein et al.

(10) Patent No.: US 12,143,295 B2
(45) Date of Patent: Nov. 12, 2024

(54) REFERENCE ARCHITECTURE FOR AN INTERNET PROTOCOL (IP) PRODUCTION MEDIA NETWORK

(71) Applicant: Disney Enterprises, Inc., Burbank, CA (US)

(72) Inventors: Michael J. Strein, Bohemia, NY (US); Benjamin H. Kepler, Palisades, NY (US); Nishith Shah, Monroe, NJ (US); David E. Potter, Altadena, CA (US); Nigel Brownett, Long Beach, CA (US)

(73) Assignee: FARJAMI & FARJAMI LLP, Mission Viejo, CA (US)

( * ) Notice: Subject to any disclaimer, the term of this patent is extended or adjusted under 35 U.S.C. 154(b) by 415 days.

(21) Appl. No.: 17/708,291

(22) Filed: Mar. 30, 2022

(65) Prior Publication Data

US 2023/0318967 A1    Oct. 5, 2023

(51) Int. Cl.
*H04L 45/24*    (2022.01)
*H04L 12/18*    (2006.01)
*H04L 12/28*    (2006.01)
*H04L 47/70*    (2022.01)

(52) U.S. Cl.
CPC .............. *H04L 45/24* (2013.01); *H04L 12/18* (2013.01); *H04L 12/2854* (2013.01); *H04L 47/82* (2013.01)

(58) Field of Classification Search
CPC ..... H04L 45/24; H04L 12/18; H04L 12/2854; H04L 47/82
See application file for complete search history.

(56) References Cited

U.S. PATENT DOCUMENTS

| | | | |
|---|---|---|---|
| 2018/0041555 A1* | 2/2018 | Manohar | H04L 45/16 |
| 2019/0090154 A1* | 3/2019 | Olderdissen | H04L 61/5014 |
| 2020/0028774 A1* | 1/2020 | Pathikonda | H04L 49/1569 |
| 2020/0344155 A1* | 10/2020 | Chhibber | H04L 47/15 |
| 2020/0412639 A1* | 12/2020 | Meo | H04L 45/125 |
| 2022/0166704 A1* | 5/2022 | Kunduru | H04L 41/0806 |
| 2022/0360462 A1* | 11/2022 | Mishra | H04L 12/18 |

* cited by examiner

*Primary Examiner* — Ricky Q Ngo
*Assistant Examiner* — Kabir U Jahangir (57) ABSTRACT

Embodiments provide systems and techniques for a network architecture design for a converged media facility. An example system includes a plurality of internet protocol (IP) networks, where each IP network is configured to provide a different service for the media facility. At least one of the IP networks is a production media network configured to route multicast media traffic. The system also includes a plurality of first network devices coupled to the plurality of IP networks and a controller configured to manage at least one IP traffic flow within at least one of the plurality of IP networks.

20 Claims, 6 Drawing Sheets

REFERENCE ARCHITECTURE FOR AN INTERNET PROTOCOL (IP) PRODUCTION MEDIA NETWORK

BACKGROUND

Media facilities (also referred to as media production facilities) generally deploy and use several different networks that are designed to handle different types of Internet Protocol (IP) network traffic associated with the media facility. For example, a media facility may deploy a first network to handle multicast IP production media traffic, a second network to handle control traffic, a third network to handle broadcast file based traffic, and so on. In media facilities with several different networks, the networks are typically isolated from one another using so called "air gaps," in which the media networks are prevented from having external connectivity. This network architecture design can pose challenges when managing network traffic throughout a media facility.

SUMMARY

One embodiment described herein is a system for a media facility. The system includes a plurality of internet protocol (IP) networks, each IP network configured to provide a different service for the media facility. At least one of the plurality of IP networks is a production media network configured to route multicast media traffic. The system also includes a plurality of first network devices coupled to the plurality of IP networks. The system further includes a controller configured to manage at least one IP traffic flow within at least one of the plurality of IP networks.

Another embodiment described herein is a computer-implemented method for managing internet protocol (IP) traffic within a media facility. The computer-implemented method includes identifying, by a computing device, a plurality of IP networks within a network system of the media facility. Each IP network of the plurality of IP networks is configured to provide a different service for the media facility. A first IP network of the plurality of IP networks is a production media network configured to route multicast media traffic. The computer-implemented method also includes controlling, by the computing device, for each of the plurality of IP networks, at least one IP traffic flow within the respective IP network.

Another embodiment described herein includes a network device. The network device includes a processor and a memory containing a program that, when executed by the processor, performs an operation. The operation includes identifying a plurality of internet protocol (IP) networks within a network system of a media facility, wherein each IP network of the plurality of IP networks is configured to provide a different service for the media facility. At least one of the plurality of IP networks is a production media network configured to route multicast media traffic. The operation also includes controlling, for each of the plurality of IP networks, at least one IP traffic flow within the respective IP network.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

As media facilities increasingly transition to supporting IP production media networks (e.g., with real-time media streams), network architects typically keep the IP production media networks completely isolated from other types of IP networks within a given media facility. Given that IP production media networks are designed to handle latency sensitive multicast media flows, IP production media networks are typically actively managed using a dedicated controller. For example, the dedicated controller may have knowledge of the bandwidth constraints of the network devices (e.g., switches) and/or ports on each network device, and may actively manage the flows across the network devices in the IP production media network, creating what is often referred to as a Software Defined Network (SDN) or Software Defined Network Orchestration (SDNO).

While IP production media networks are typically actively managed using a dedicated controller, other IP networks with less latency sensitive network traffic are not actively managed. Consequently, it has been traditionally "safer" to isolate the IP production media networks from these other (unmanaged) IP networks within the media facility. However, as the number of IP networks continues to increase, it has become significantly challenging for network architects to manage a group of separate networks. For example, network architects may lack the ability to comprehensively view the entire network structure, and may have to manage each network separately.

To address this, embodiments herein describe a network architecture for a converged media facility with multiple deployed IP networks. In one embodiment described herein, a media facility includes a network architecture where different IP traffic (from different IP networks) may converge (or connect) at a same border leaf layer with one or more border leafs (or network devices). The converged network allows for physical connection of all the hardware within the different IP networks, but logically divides and manages the IP traffic appropriately within the different IP networks. In this manner, embodiments can provide administrators (or other users) with significant more functionality compared to conventional network architectures.

For example, embodiments may allow users to manage the converged network (with the different IP networks) as a single cohesive fabric. In one embodiment, a broadcast controller that generally provides SDN control for an IP production media network can gain visibility to, and manage, signals that it would otherwise not be able to see in a conventional network architecture. These signals can include, but are not limited to, control traffic, file updates, telephony, audio signals, real-time media streams, etc. In other words, embodiments described herein extend the functionalities of the broadcast controller beyond conventional SDN control to control other unmanaged IP networks (e.g., non-bandwidth managed IP networks). For example, in addition to, or as an alternative to, controlling the IP production media network, the broadcast controller can control other IP networks to bring IP traffic in, transcode IP traffic, convert protocols or formats, etc. Additionally, the broadcast controller can provide support/maintenance operations, such as security policies, switch upgrades, etc. to the fabric as a whole, as opposed to each separate network device (e.g., switch) individually.

Note that many of the following embodiments use a production media network, a production control network, and a production stream network as reference examples of different IP networks that can be included within the network architecture for a converged media facility. Note that the techniques described herein for implementing a converged media facility can include different types of IP networks and/or any combination of IP networks. As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Figure 1:
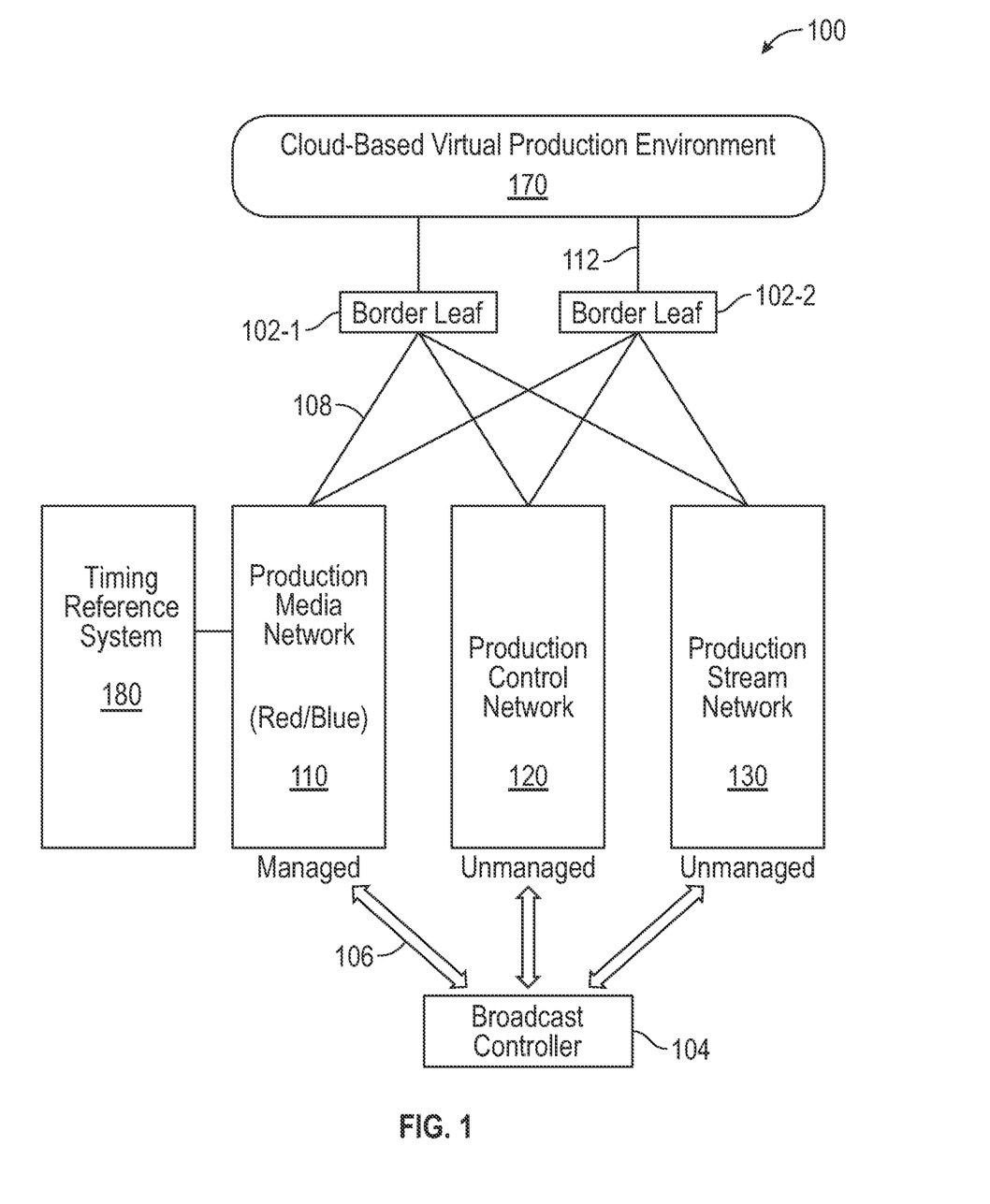
FIG. 1 illustrates an example network architecture for a converged media facility, according to one embodiment.

FIG. 1 illustrates an example network architecture 100 for a converged media facility, according to one embodiment. As shown, the network architecture 100 includes a border leaf 102-1, a border leaf 102-2, a broadcast controller 104, a production media network (PMN) 110, a production control network (PCN) 120, a production stream network (PSN) 130, a cloud-based virtual production environment 170, and a timing reference system 180. The PMN 110, PCN 120, and the PSN 130 are interconnected to each of the border leafs 102 via a set of communication links 108. The cloud-based virtual production environment 170 is also interconnected to each of the border leafs 102 via communication links 112. The broadcast controller 104 is communicatively coupled to the PMN 110, PCN 120, and the PSN 130 via communication links 106. Each of the communication links 106, 108, and 112 can include wired communication links, wireless communication links, or a combination of wired and wireless communication links. Note that while FIG. 1 depicts the border leafs 102 being connected to the cloud-based virtual production environment 170, in certain embodiments, the border leafs 102 may be connected to one or more wide area networks (WANs) targets (e.g., in other geographical locations). Additionally, while FIG. 1 depicts the network architecture 100 including two border leafs 102 and three IP networks (e.g., PMN 110, PCN 120, and PSN 130), in other embodiments, the network architecture 100 can include any number of border leafs 102 and/or any number of IP networks.

The PMN 110 is generally configured to receive, process, and/or generate multicast production media flows. As described below, the PMN 110 includes fully redundant separate IP networks (e.g., a first ("Red") PMN network and a second ("Blue") PMN network) for resiliency. The multicast production media flows can include media-over-IP multicast production media flows (e.g., Society of Motion Picture and Television Engineers (SMPTE) ST 2110 in 1080P HD). The PCN 120 and the PSN 130 are generally configured to receive, process, and/or generate unicast flows. For example, the PCN 120 may include file-based type IP traffic, control signals, etc., and the PSN 130 may include video feeds, audio feeds, etc.

The PMN 110 may distribute time reference data, such as Precision Time Protocol (PTP) time reference data, throughout its network for accurate timing of the multicast production media flows. PTP time reference data can be shared throughout the PMN 110 to provide a synchronized clock to media nodes (e.g., cameras, audio devices, video encoders, audio encoders, etc.) connected to the network. That is, the switches and other network devices within PMN 110 may distribute clock signals (e.g., timestamps) that can synchronize local clocks to a master clock using a PTP method, such as the Best Master Clock Algorithm (BMCA). In this manner, the PTP time reference data enables the media nodes to provide accurate timing and packet pacing for the multicast production media flows. The PTP time reference data may be introduced into the PMN 110 via the timing reference system 180. For example, although not shown in FIG. 1, the timing reference system 180 may include a reference generator(s), transparent clock(s), and boundary clock(s). Compared to the PMN 110, the PCN 120 and PSN 130 may not require accurate timing for the IP traffic that is routed within their networks, and therefore, the PCN 120 and PSN 130 may not support distributing PTP time reference data throughout their networks.

The PMN 110 is generally configured to support IP traffic that is significantly larger than the amount of IP traffic supported within the PCN 120 and the PSN 130. In certain embodiments, the IP traffic within the PMN 110 may be orders of magnitude greater than the IP traffic within the PCN 120 and the PSN 130. For example, the PMN 110 may be able to support multiple gigabit IP traffic (e.g., 3 Gigabit (Gb) flows and greater), whereas the PCN 120 and/or the PSN 130 may be able to support multiple megabit IP traffic (e.g., 5 Megabit (Mb) flows, 10 Mb flows, etc.).

"Multicast" is a term used to describe communication in which a piece of information is sent from one or more points to a set of other points. In this case there may be one or more senders, and the information is distributed to a group of receivers. One example of an application which may use multicast is a video server sending out networked television channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. IP multicast provides dynamic many-to-many connectivity between a set of senders (at least one) and a group of receivers.

In contrast, "unicast" is a term used to describe communication in which a piece of information is sent from one point to another point. In this case, there is just one sender and one receiver. Unicast transmission, in which a packet is sent from a single source to a specified destination, is a predominant form of transmission on local area networks (LANs) and within the Internet. LANs, such as Ethernet, for example, as well as some IP networks, may support the unicast transfer mode. Examples of the standard unicast applications supported by LANs and IP networks include Hypertext Transfer Protocol (HTTP), Simple Mail Transfer Protocol (SMTP), File Transfer Protocol (FTP), and Telnet, each of which employs Transmission Control Protocol (TCP).

The format of an IP multicast packet may be identical to that of unicast packets and may be distinguished by using a special class of destination address (e.g., class D IPV4 address), which denotes a specific multicast group. Since TCP supports only the unicast mode, multicast applications typically use the User Datagram Protocol (UDP) transport protocol. Unlike broadcast transmission, which is used on some LANs, multicast clients receive a stream of packets only if they have previously elected to do so, for example, by joining the specific multicast group address. Membership of a group may be dynamic and may be controlled by the receivers, which are informed by the local client applications. The routers in a multicast network learn which sub-networks have active clients for each multicast group and attempt to minimize the transmission of packets across parts of the network for which there are no active clients. The multicast mode is useful if a group of clients require a common set of data at the same time, or when the clients are able to receive and store common data until needed.

The cloud-based virtual production environment 170 generally includes cloud-based resources that can receive and process cloud production media flows. The cloud production media flows may correspond to multicast production media flows. The cloud-based virtual production environment 170 may generate post-production cloud media flows by processing the cloud production media flows—e.g., by converting the cloud production media flows from a cloud permissible media flow type, such as unicast, to multicast. In general, the cloud-based virtual production environment 170 may also support the exchange of multicast traffic and/or unicast traffic. Although not shown, the network architecture 100 can include communication links between the cloud-based virtual production environment 170 and the broadcast controller 104, which may be provided by an application programming interface (API).

The broadcast controller 104 is generally configured to provide SDN control over the PMN 110. For example, as part of SDN control, the broadcast controller 104 may be configured to manage the bandwidth and allocation of multicast production media flows across network devices within the PMN 110, identify and reserve resources for production processes (e.g., conversions, compression, etc.), manage the connections between network devices within the PMN 110, etc. In certain embodiments, the SDN functionality of the broadcast controller 104 is extended to allow the broadcast controller 104 to manage and control IP flows in and across the PMN 110, PCN 120, PSN 130, and/or the cloud-based virtual production environment 170. In one embodiment, the broadcast controller 104 has visibility into flow management, bandwidth, sources, and destinations for IP flows in the PMN 110, PCN 120, PSN 130, and cloud-based virtual production environment 170. For example, the broadcast controller 104 has visibility to, and can manage other types of IP traffic (e.g., other types of media flows, such as compressed video/audio feeds from the Internet, control traffic and file updates from the PCN 120, etc.) that are non-native to the PMN 110 (e.g., IP traffic within unmanaged IP networks).

In one embodiment, the broadcast controller 104 may allow for IP traffic (that is non-native to the PMN 110) to ingress and/or egress the PMN 110 from other IP networks. Additionally, the broadcast controller 104 may allow for IP traffic that is native to the PMN 110 to ingress and/or egress other IP networks. More generally, the broadcast controller 104 can send IP traffic from a source to a destination through different IP networks in the network architecture 100. For example, the broadcast controller 104 can send unicast IP flows from the PCN 120 through the PSN 130, via the border leafs 102. In another example, the broadcast controller 104 can send unicast IP flows from the PSN 130 through the PCN 120, via the border leafs 102. In another example, the broadcast controller 104 can send unicast IP flows (e.g., from the PCN 120 and/or PSN 130) through the PMN 110. In such an example, the broadcast controller 104 may convert the unicast IP flows into multicast flows prior to routing the IP flows through the PMN 110. Likewise, the broadcast controller 104 can send multicast IP flows from the PMN 110 through the PCN 120 and/or PSN 130 by converting the multicast IP flows to unicast IP flows prior to routing the IP flows through the PCN 120 and/or PSN 130.

When sending IP traffic across different networks, the broadcast controller 104 can manage transcoding of the IP traffic, via the border leafs 102. For example, the border leaf(s) 102 may be configured (or triggered) by the broadcast controller 104 to transcode the data from an IP flow received from the PMN 110 before routing the data through the PCN 120 and/or PSN 130. Similarly, the border leaf(s) 102 may be configured by the broadcast controller 104 to transcode the data from an IP flow received from the PCN 120 and/or PSN 130 before routing the data through the PMN 110.

As noted, the network architecture 100 allows for the broadcast controller 104 to have visibility into each source and destination that is connected to one or more of the IP networks (e.g., PMN 110, PCN 120, PSN 130, etc.) in the network architecture 100. By enabling the broadcast controller 104 to have this visibility, the broadcast controller 104 can manage the routing, bandwidth, security, etc. of all the IP traffic from the sources and destinations as a single cohesive fabric. For example, the broadcast controller 104 may view source(s) connected to a given IP network (e.g., PMN 110, PCN 120, PSN 130, etc.), control how IP traffic generated from the source(s) are routed through the network architecture 100, provide bandwidth management for the IP traffic, allocate bandwidth to various links and network devices in the network architecture 100 for the IP traffic, send different portions of the IP traffic to different destinations in the same IP network or different IP networks, etc. The broadcast controller 104 can also provide support/maintenance operations, such as security polices, switch upgrades, etc., to the entire fabric as a whole.

Figure 2:
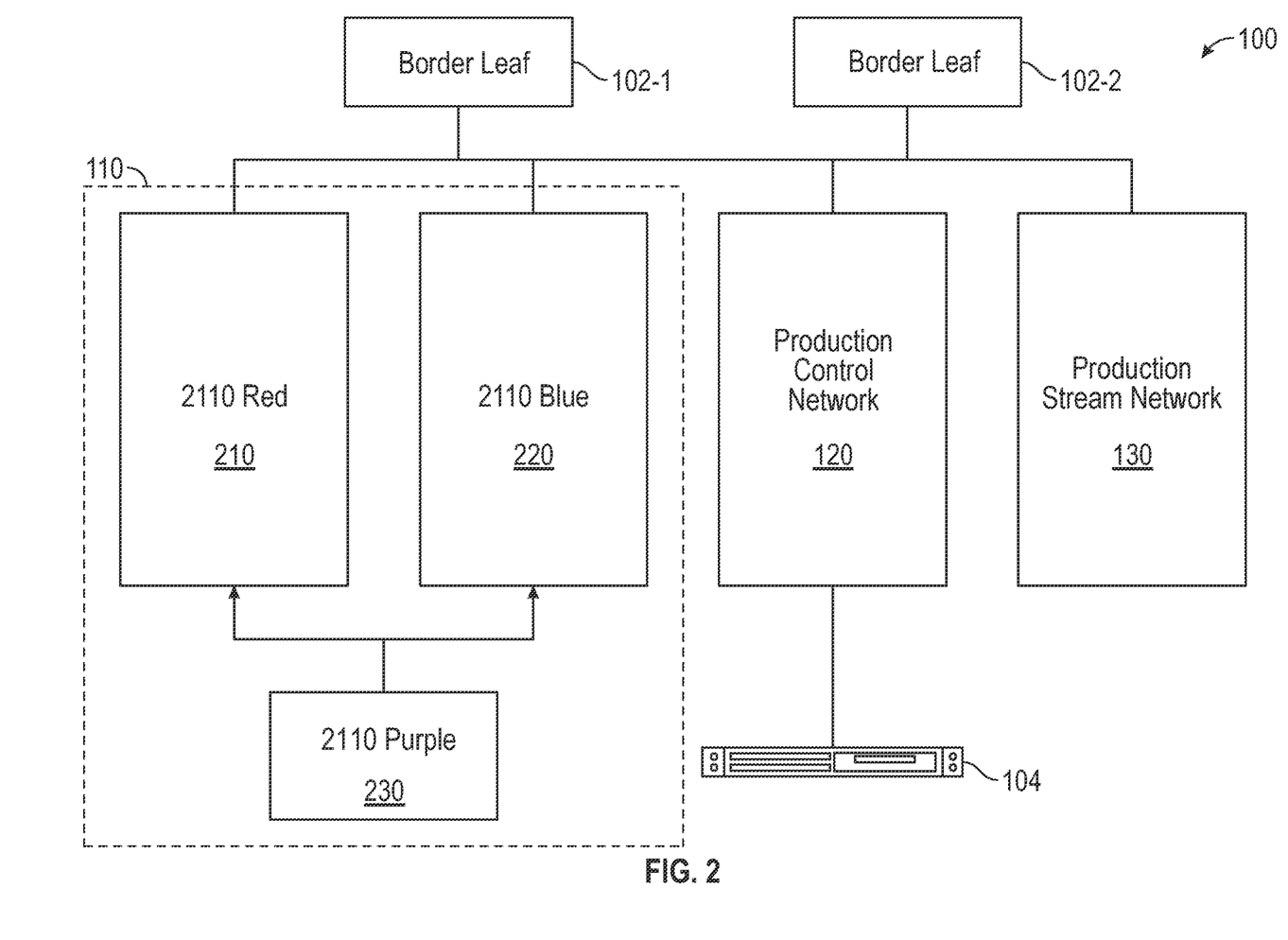
FIG. 2 further illustrates certain components of the network architecture in FIG. 1 in more detail, according to one embodiment.

FIG. 2 further illustrates certain components of the network architecture 100 in FIG. 1 in more detail, according to one embodiment. As shown in this embodiment, the PMN 110 includes a network 210 (e.g., a Red network), a network 220 (e.g., a Blue network), and a network 230 (e.g., a Purple network). In one embodiment, the networks 210, 220, and 230 are managed media-over-IP multicast networks. In a particular embodiment, the networks 210, 220, and 230 are SMPTE ST 2110 networks.

The networks 210 and 220 may be independent, fully redundant IP networks. That is, the networks 210 and 220 may include the same (or similar) set of network devices, may be connected to the same sources, may be connected to the same border leafs 102, may include the same IP traffic, etc. Deploying fully redundant networks 210 and 220 can provide a measure of resiliency in the event one of the IP networks encounters a failure or otherwise becomes unavailable.

The network 230 is an IP network that generally includes a combination of IP traffic from the network 210 and the network 220. For example, the network 230 may include network devices that are connected to both the network 210 and the network 220. Additionally, the network 230 may include network devices that are connected to solely the network 220 and/or network devices that are connected to solely the network 230.

Figure 3:
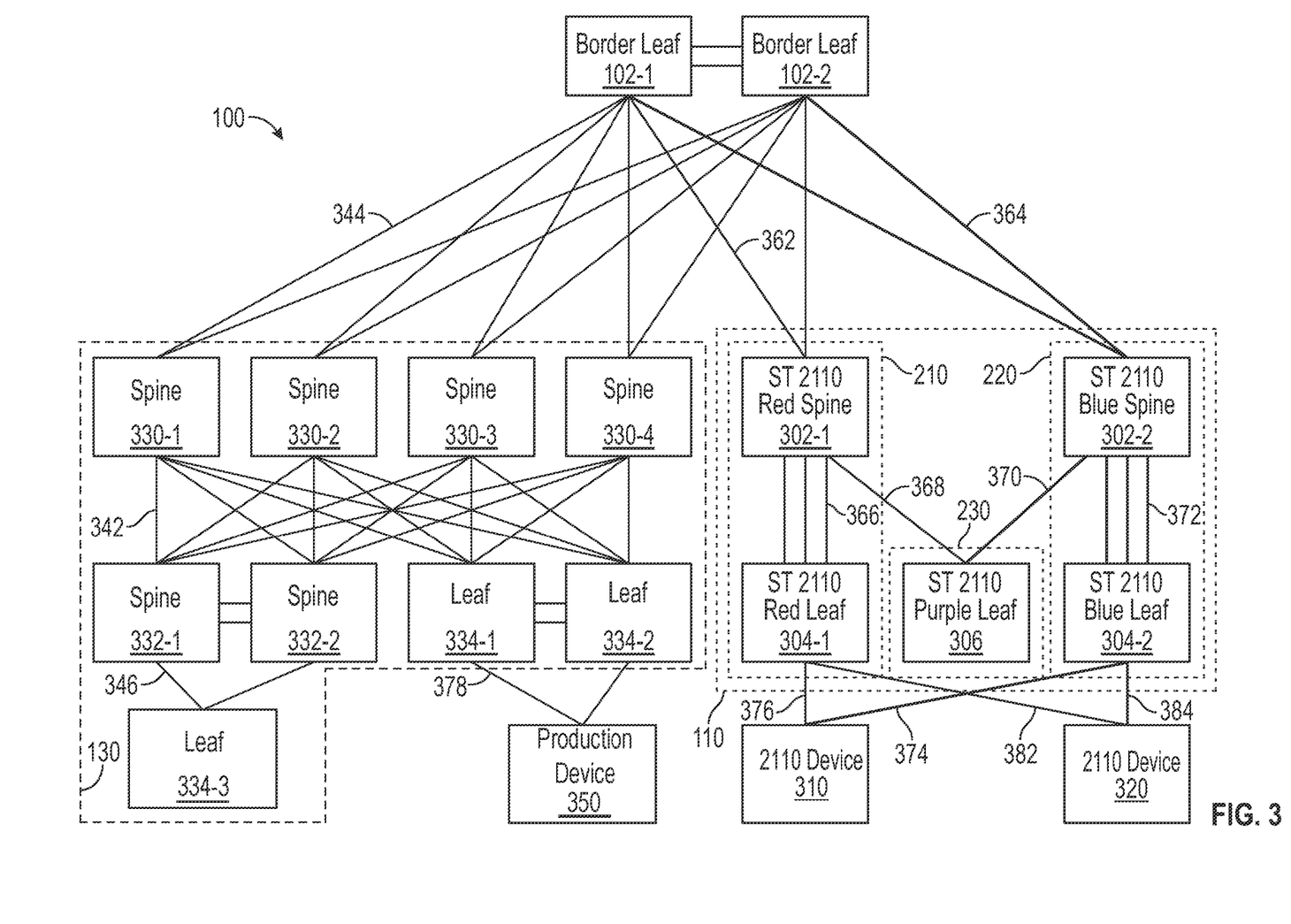
FIG. 3 further illustrates certain components of the network architecture in FIG. 2 in more detail, according to one embodiment.

FIG. 3 further illustrates certain components of the network architecture 100 in FIG. 2 in more detail, according to one embodiment. For the sake of clarity, the PCN 120 is not illustrated in FIG. 3. Note, however, that the PCN 120 may be similar to the PSN 130 depicted in FIG. 3 (e.g., the PCN 120 may include a spine-leaf architecture).

In the embodiment depicted in FIG. 3, the PSN 130 has a spine-leaf architecture. The spine layer is generally the backbone of the network and is responsible for interconnecting the leaf switches. The leaf layer generally includes access switches that connect to devices, such as production devices (e.g., microphone, camera, video editing hardware, etc.). In this example, the PSN 130 includes a spine layer with multiple spine switches 330 (including spine switch 330-1, spine switch 330-2, spine switch 330-3, and spine switch 330-4). The PSN 130 also includes a leaf layer with spine switches 332 (including spine switch 332-1 and spine switch 332-2) and leaf switches 334 (including leaf switch 334-1 and leaf switch 334-2). In one embodiment, a subset of switches in a lower-tier layer may serve as the spine layer for another leaf layer. In PSN 130, for example, the spine switches 332 serve as the spine layer for the leaf switch 334-3.

In some embodiments, the PSN 130 may be deployed as part of a set of interconnected local area networks (LANs) serving a set of buildings in close proximity (typically referred to as a campus network). In these embodiments, one or more of the network devices in the PSN 130 may be used as campus network devices. For example, the leaf switch 334-3 may be a campus leaf switch that provides access to one or more production devices in a campus network. The campus leaf switch may receive management traffic via a loopback interface on one or more uplink ports of the campus leaf switch.

The PSN 130 may include one or more end points, where each end point is connected to at least one of the leaf switches. Each end point can include a server, a production device, a virtual machine, a software application, etc. Here, the leaf switches 334 are both coupled to a production device 350 (e.g., an end point) via a link 378. The production device 350 may be configured with link aggregation (LAG) and integrated lights out (iLO).

The network devices in the PSN 130 may use a load balancing algorithm (or protocol) to select which switch for forwarding IP traffic. In one embodiment, the load balancing algorithm is equal cost multipath (ECMP); however, other embodiments can use different load balancing algorithms. The PSN 130 may also support a routing protocol, such as border gateway protocol (BGP) for carrying routing information between the network devices in the PSN 130.

The PMN 110 includes networks 210 and 220, each of which has a spine-leaf architecture. For example, the network 210 includes a spine switch 302-1 and a leaf switch 304-1. Similarly, the network 220 includes a spine switch 302-2 and a leaf switch 304-2. The spine switches 302 may be ST 2110 network devices, and the leaf switches 304 may be ST 2110 network devices. The PMN 110 also includes network 230, which includes a leaf switch 306. The leaf switch 306 may be a ST 2110 network device. The leaf switch 306 may be used to connect end points that have a single network interface card (NIC) (e.g., a single Ethernet connection) to the networks 210 and 220. For example, an end point such as a media node (e.g., a 2110 media device) may not have two NICs (e.g., two Ethernet connections) allowing it to connect directly to the networks 210 and 220. In such an example, the media node can use its single NIC to connect to the leaf switch 306, and the leaf switch 306 may connect to the networks 210 and 220 via respective links 368 and 370, allowing the media node to connect to the networks 210 and 220 via its single NIC.

The spine switch 302-1 and the spine switch 302-2 may be connected to one or more border leafs 102. In one embodiment, the spine switch 302-1 is connected to both border leafs 102 via links 362, but a first link 362 may be active and a second link 362 may be inactive. In another embodiment, the spine switch 302-1 may be connected to only one of the border leafs 102. Similarly, in one embodiment, the spine switch 302-2 is connected to both border leafs 102 via links 364, but a first link 364 may be active and a second link 364 may be inactive. In another embodiment, the spine switch 302-2 may be connected to only one of the border leafs 102.

Due in part to the large amount of IP traffic exchanged within the PMN 110, the spine switches 302 may be connected to leaf switches via multiple links. For example, the spine switch 302-1 is connected to the leaf switch 304-1 via multiple (e.g., three) links 366, and the spine switch 302-2 is connected to the leaf switch 304-2 via multiple (e.g., three) links 372. The spine switch 302-1 is connected to the leaf switch 306 via a link 368 and the spine switch 302-2 is connected to the leaf switch 306 via a link 370.

Each of the leaf switches 304 is connected to multiple end points. For example, leaf switch 304-1 is connected to a 2110 device 310 via a link 376 and is connected to a 2110 device 320 via a link 382. Similarly, leaf switch 304-2 is connected to the 2110 device 320 via link 384 and is connected to the 2110 device 310 via a link 374. A 2110 device may include a device (e.g., microphone, headset, video camera, etc.) that supports (or operates) according to the SMPTE ST 2110 standard. The 2110 device 310 may be a 2110 device with out-of-band control or in-band control. Similarly, the 2110 device 320 may be a 2110 device with out-of-band control or in-band control. The bandwidth supported by the links within the PMN 110 may be significantly larger than the bandwidth supported by the links within the PSN 130. For example, in some embodiments, the links within the PMN 110 may be multi-gigabyte links, whereas the links within the PSN 130 may be multi-megabyte links.

Figure 4:
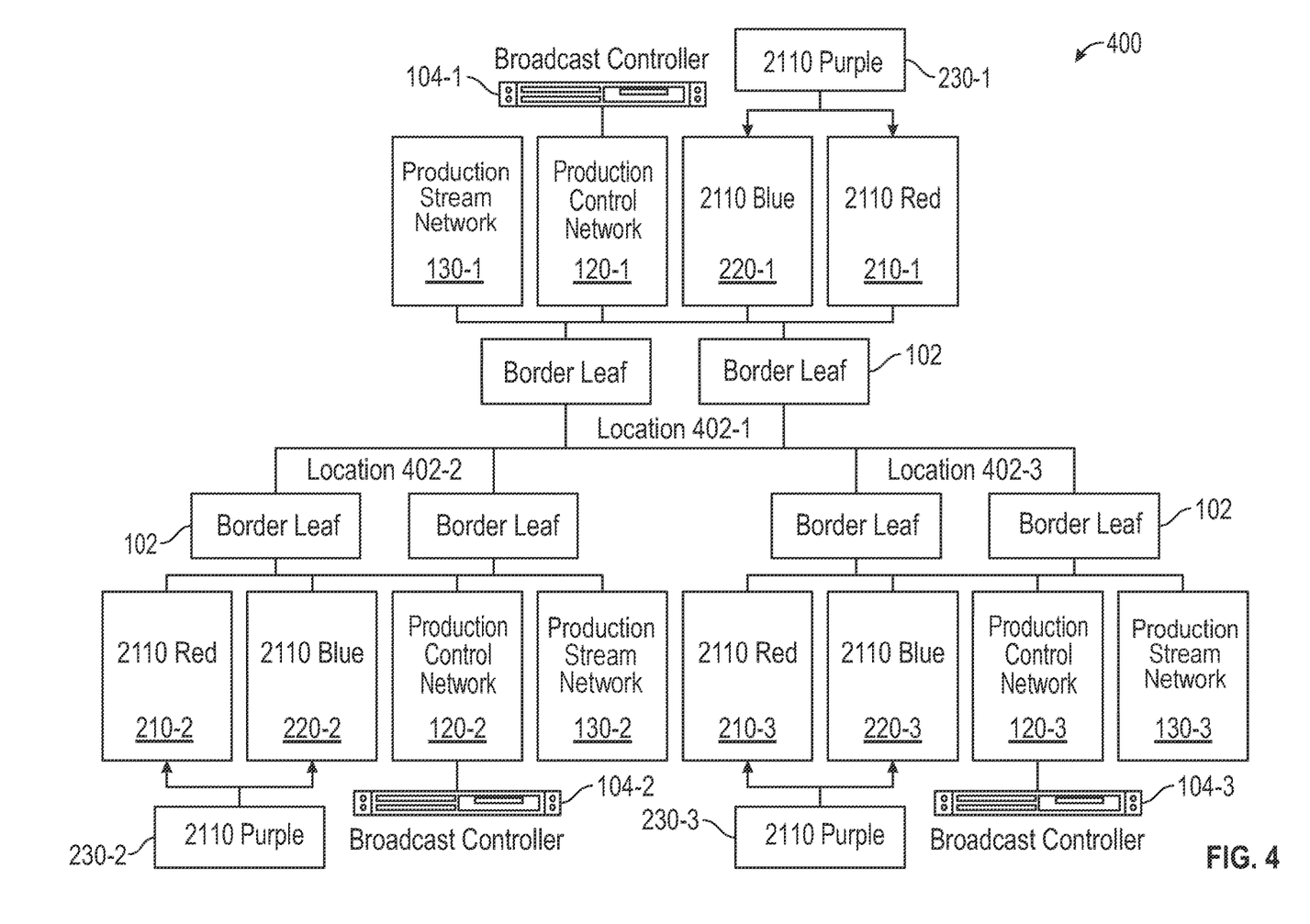
FIG. 4 illustrates another example network architecture, according to one embodiment.

As noted, the network architecture described herein may allow for managing multiple IP networks across multiple geographical locations as a single cohesive fabric. FIG. 4 shows a reference example network architecture 400 with multiple geographical locations 402 (including geographical location 402-1, geographical location 402-2, and geographical location 402-3) connected at the same border leaf layer with multiple border leafs 102. In this example, the border leafs 102 in each geographical location can connect to a set of WAN targets in another geographical location. As shown, each geographical location 402 includes a respective set of IP networks (e.g., PMN 110 with networks 210, 220 and 230, PCN 120, PSN 130) managed by a broadcast controller 104. Note that while three geographical locations are depicted in FIG. 4, in other embodiments, the techniques described herein can be used to interconnect any number of geographical locations.

Figure 5:
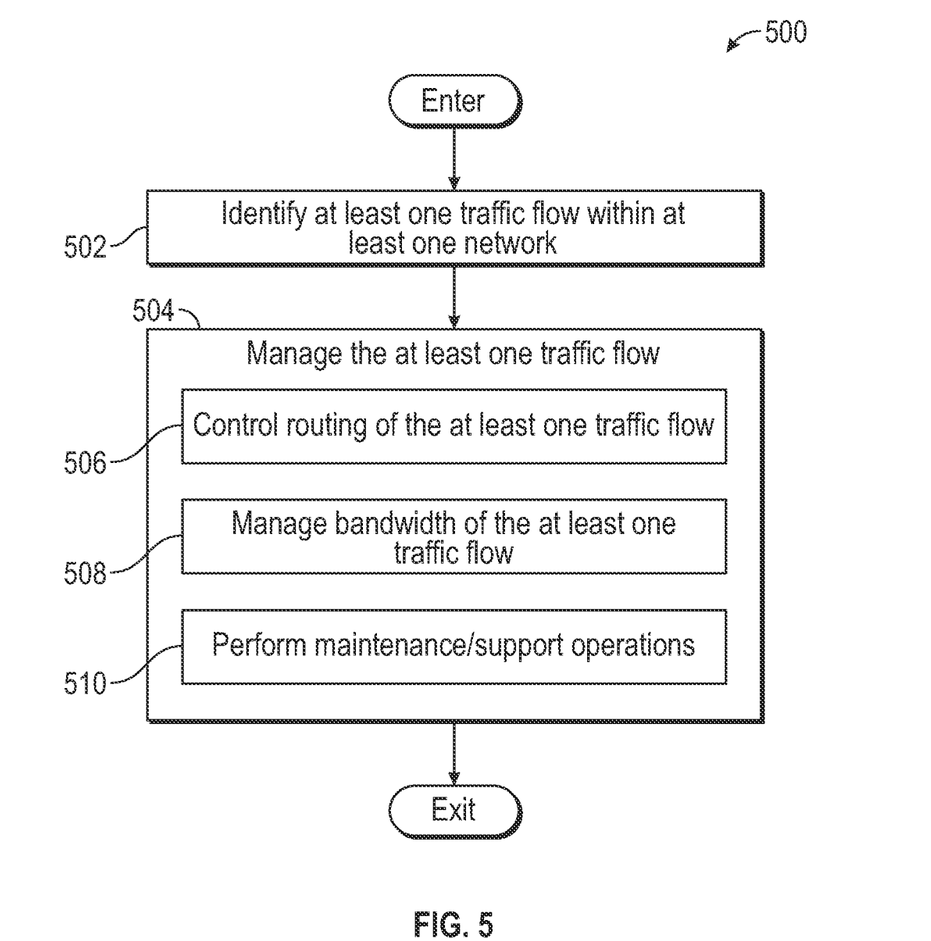
FIG. 5 is a flowchart of a method for managing a network architecture for a converged media facility, according to one embodiment.

FIG. 5 is a flowchart of a method 500 for managing multiple IP networks, according to one embodiment. For example, the method 500 may be used for managing a network architecture 100 for a converged media facility. The method 500 may be performed by a computing device (e.g., broadcast controller 104). In certain embodiments, the method 500 may be performed by a set of computing devices (e.g., multiple broadcast controllers 104).

Method 500 enters at block 502, where the computing device identifies at least one traffic flow within at least one network. The at least one traffic flow can include, for example, an IP traffic flow (e.g., a media-over-IP multicast media flow, a unicast flow, etc.). The at least one network can include a PMN 110, a PCN 120, a PSN 130, etc. In embodiments where the media facility includes multiple networks, each network may be configured to provide a different service for the media facility (e.g., a first network may be a PMN, a second network may be a PCN, etc.). At block 504, the computing device manages the at least one traffic flow. Block 504 may include one or more (or combination of) sub-blocks 506, 508, and 510.

At block 506, the computing device controls routing of the at least one traffic flow. For example, assuming the at least one traffic flow includes a multicast media flow, the computing device can control how the multicast media flow is routed within the PMN 110, control a destination(s) of the multicast media flow (e.g., different portions of the multicast media flow may be sent to different destinations), etc. In another example, assuming the at least one traffic flow includes IP traffic that is non-native to the PMN 110 (e.g., unicast traffic), the computing device can control whether the IP traffic ingresses the PMN 110, control how the IP traffic egresses the PMN 110, convert the IP traffic to multicast, trigger transcoding of the IP traffic, send the IP traffic (or different portions of the IP traffic) to one or more destinations, etc.

At block 508, the computing device manages bandwidth of the at least one traffic flow. For example, the computing device can allocate bandwidth to the multicast flows, unicast flows, etc. At block 510, the computing device performs maintenance/support operations for network devices across the IP networks. For example, the computing device can trigger security policies, switch upgrades, etc., across multiple IP networks (as opposed to each individual network device separately within the respective IP network).

Figure 6:
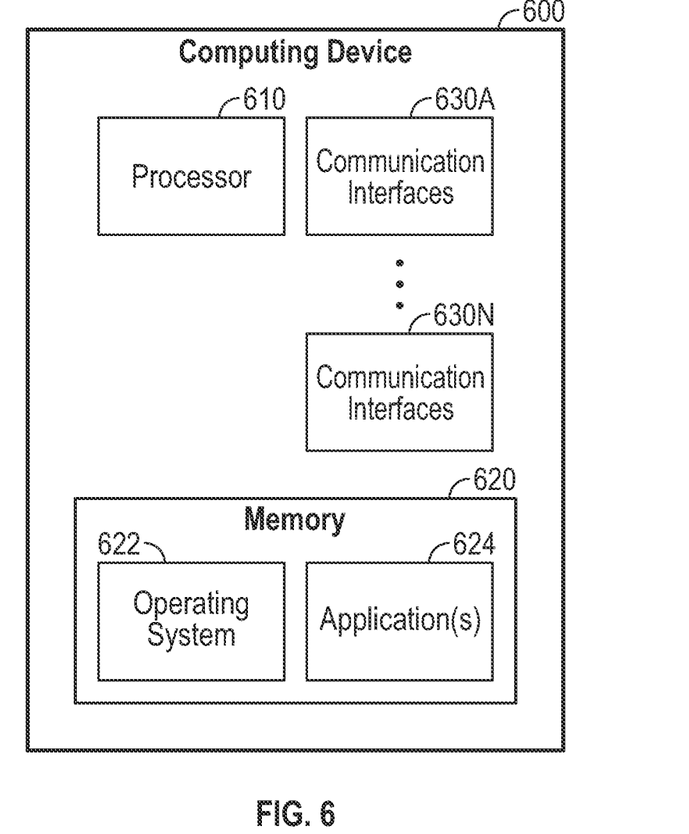
FIG. 6 illustrates an example computing device, according to one embodiment.

FIG. 6 illustrates an example computing device 600, according to one embodiment. The computing device 600 may be a broadcast controller that is configured to manage IP traffic within one or more IP networks of a converged media facility. The computing device 600 includes a processor 610, a memory 620, and one or more communication interfaces 630 A-N (generally, communication interface 630). In various embodiments, the computing device 600 may represent a user device, a server, a router, an access node or any other computing device connected to or part of the network architecture 100.

The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communications interfaces 630 are representative of wireless communications antennas and various wired communication ports. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 622 to manage various functions of the computing device 600. As shown, the memory 620 includes an operation system 622 and one or more applications 624.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system for a media facility, the system comprising:
a plurality of internet protocol (IP) networks, each IP network configured to provide a different service for the media facility, wherein the plurality of IP networks includes:
a production media network configured to route a multicast media traffic;
a production control network configured to route a first unicast media traffic; and
a production stream network configured to route a second unicast media traffic;
a border leaf, wherein the multicast media traffic, the first unicast media traffic and the second unicast media traffic converge at the border leaf;
a controller configured to control the production media network, the production control network and the production stream network, wherein the production media network is a managed network, and the production control network and the production stream network are unmanaged networks.

2. The system of claim 1, wherein each IP network of the plurality of IP networks comprises a plurality of second network devices in a spine-leaf architecture.

3. The system of claim 2, wherein:
the plurality of second network devices in the spine-leaf architecture for each IP network of the plurality of IP networks comprises (i) a set of spine switches and (ii) a set of leaf switches; and
each leaf switch in the set of leaf switches is connected to each spine switch in the set of spine switches.

4. The system of claim 3, wherein each spine switch in the set of spine switches is coupled to each of the plurality of first network devices.

5. The system of claim 2, wherein:
the production media network comprises (i) a first IP network of the plurality of IP networks and (ii) a second IP network of the plurality of IP networks;
the plurality of second network devices in the spine-leaf architecture for the first IP network comprises (i) a first spine switch and (ii) a first leaf switch coupled to the first spine switch; and
the plurality of second network devices in the second IP network comprises (i) a second spine switch and (ii) a second leaf switch coupled to the second spine switch.

6. The system of claim 5, wherein:
the first spine switch is coupled to a single first network device of the plurality of first network devices; and
the second spine switch is coupled to another single first network device of the plurality of first network devices.

7. The system of claim 5, wherein the first IP network and the second IP network are redundant to each other.

8. The system of claim 5, wherein:
the first spine switch is coupled to the first leaf switch via a first plurality of links; and
the second spine switch is coupled to the second leaf switch via a second plurality of links.

9. The system of claim 5, wherein the first IP network and the second IP network are configured for media-over-IP multicast traffic.

10. The system of claim 1, wherein the controller is configured to manage the first unicast media traffic by controlling routing of the first unicast media traffic via the production control network.

11. The system of claim 1, wherein each of the plurality of IP networks is configured for a different type of IP traffic.

12. A computer-implemented method for managing internet protocol (IP) traffic within a media facility, the computer-implemented method comprising:
identifying, by a computing device, a plurality of IP networks within a network system of the media facility, wherein each IP network of the plurality of IP networks is configured to provide a different service for the media facility, and wherein the plurality of IP networks includes:
a production media network configured to route multicast media traffic;
a production control network configured to route a first unicast media traffic; and a production stream network configured to route a second unicast media traffic;

controlling, by the computing device, the production media network, the production control network and the production stream network, wherein the production media network is a managed network, and the production control network and the production stream network are unmanaged networks.

13. The computer-implemented method of claim 12, wherein controlling comprises routing first unicast media traffic via the production control network.

14. The computer-implemented method of claim 12, wherein each IP network of the plurality of IP networks comprises a plurality of second network devices in a spine-leaf architecture.

15. The computer-implemented method of claim 14, wherein:
the plurality of second network devices in the spine-leaf architecture for each IP network of the plurality of IP networks comprises (i) a set of spine switches and (ii) a set of leaf switches; and
each leaf switch in the set of leaf switches is connected to each spine switch in the set of spine switches.

16. The computer-implemented method of claim 15, wherein each spine switch in the set of spine switches is coupled to each of the plurality of first network devices.

17. The computer-implemented method of claim 15, wherein:

the production media network comprises (i) a first IP network of the plurality of IP networks and (ii) a second IP network of the plurality of IP networks;
the plurality of second network devices in the spine-leaf architecture for the first IP network comprises (i) a first spine switch and (ii) a first leaf switch coupled to the first spine switch; and
the plurality of second network devices in the second IP network comprises (i) a second spine switch and (ii) a second leaf switch coupled to the second spine switch.

18. The computer-implemented method of claim 17, wherein:
the first spine switch is coupled to a single first network device of the plurality of first network devices; and
the second spine switch is coupled to another single first network device of the plurality of first network devices.

19. The computer-implemented method of claim 17, wherein the first IP network and the second IP network are redundant to each other.

20. The computer-implemented method of claim 17, wherein:
the first spine switch is coupled to the first leaf switch via a first plurality of links; and
the second spine switch is coupled to the second leaf switch via a second plurality of links.

* * * * *

UNITED STATES PATENT AND TRADEMARK OFFICE
CERTIFICATE OF CORRECTION

| | | |
|---|---|---|
| PATENT NO. | : 12,143,295 B2 | Page 1 of 1 |
| APPLICATION NO. | : 17/708291 | |
| DATED | : November 12, 2024 | |
| INVENTOR(S) | : Strein et al. | |

It is certified that error appears in the above-identified patent and that said Letters Patent is hereby corrected as shown below:

On the Title Page

Item (73), Assignee "Farjami & Farjami LLP, Mission Viejo, CA (US)" should be --Disney Enterprises, Inc, Burbank, CA (US)--.

Signed and Sealed this
Twenty-fourth Day of December, 2024

Derrick Brent
*Acting Director of the United States Patent and Trademark Office*